(12) United States Patent
Buxton et al.

(10) Patent No.: US 6,191,784 B1
(45) Date of Patent: *Feb. 20, 2001

(54) USER INTERFACE SYSTEM AND METHOD FOR CONTROLLING PLAYBACK TIME-BASED TEMPORAL DIGITAL MEDIA

(75) Inventors: William Arthur Stewart Buxton; George William Fitzmaurice, both of Toronto (CA)

(73) Assignee: Silicon Graphics, Inc., Moutain View, CA (US)

( * ) Notice: Under 35 U.S.C. 154(b), the term of this patent shall be extended for 0 days.

This patent is subject to a terminal disclaimer.

(21) Appl. No.: 09/100,246

(22) Filed: Jun. 19, 1998

Related U.S. Application Data

(62) Division of application No. 08/511,479, filed on Aug. 4, 1995, now Pat. No. 5,790,769.

(51) Int. Cl.[7] .................................................. G06F 3/00
(52) U.S. Cl. ......................... 345/328; 345/473; 345/163
(58) Field of Search .................................. 345/328, 326, 345/473–475, 159, 163

(56) References Cited

U.S. PATENT DOCUMENTS

| | | | |
|---|---|---|---|
| 5,469,191 | * 11/1995 | Smith, III et al. .................. | 345/157 |
| 5,513,306 | * 4/1996 | Mills et al. ......................... | 707/530 |
| 5,530,455 | * 6/1996 | Gillick et al. ...................... | 345/163 |
| 5,790,769 | * 8/1998 | Buxton et al. ..................... | 345/473 |
| 5,828,371 | * 10/1998 | Cline et al. ........................ | 345/328 |
| 6,018,337 | * 1/2000 | Peters et al. ...................... | 345/328 |

* cited by examiner

Primary Examiner—Raymond J. Bayerl
Assistant Examiner—Sy D. Luu
(74) Attorney, Agent, or Firm—Sterne, Kessler, Goldstein & Fox pllc

(57) ABSTRACT

A system and method that maps temporal control functions into a six degree of freedom pointing device. The six degree of freedom pointing device controls both transport and view modes within a time-based media editing system and allows a user to toggle between modes without losing visual contact with graphical objects appearing on a video screen. During playback operations in the transport (temporal) mode, the system allows a cap on the six degree of freedom pointing device to be divided into multiple uneven regions in one direction along a single degree of freedom. Each of the multiple regions then corresponds to a unique rate of frame increments/decrements.

2 Claims, 7 Drawing Sheets

USER INTERFACE SYSTEM AND METHOD FOR CONTROLLING PLAYBACK TIME-BASED TEMPORAL DIGITAL MEDIA

This application is a divisional application of and claims priority to U.S. patent application Ser. No. 08/511,479, filed Aug. 4, 1995, now U.S. Pat. No. 5,790,769.

BACKGROUND OF THE INVENTION

1. Field of the Invention

This invention relates generally to user interface devices. More particularly, the invention relates to interface devices for controlling temporal digital media including video, audio and animation.

2. Related Art

In current advanced computer-based, time-based media editing systems, inputs from a pair of devices are used to edit and control graphical objects contained within temporal digital media (e.g., audio, video and animation). Typically one of the devices is controlled by the dominant hand and the other by the non-dominant hand of the user. The device controlled by the non-dominant hand, the "manipulator" device, may be a six degree of freedom pointing device that is used to control the translation and rotation of a particular graphical object. The device controlled by the dominant hand is typically a locator device. This "pointing" device (e.g., mouse or stylus) is used to edit characteristics of the graphical object. In combination, this pair of devices allows a user to control and edit graphical objects appearing in a single graphical window for a specific time unit (e.g., frame).

As part of an overall editing process, the visually demanding task of manipulating objects in a single frame is magnified when working with a sequence of frames in video and animation. Moreover, the presentation of the frame is meaningful only in the context of a sequence of frames that portray virtual motion in video and animation. Accordingly, the editing of a graphical object, whose virtual movement spans multiple frames, represents an iterative process. This iterative process requires the editing of frames whose effect is continually scrutinized during video playback.

In known systems, the temporal control of the video playback is accomplished through a variety of devices and techniques. In one system, a "jog-shuttle" or "scrub wheel" is implemented as a dedicated, specialized transducer for issuing time commands. This device exists as a physical knob that controls video playback according to the knob's position along the one dimension of rotational freedom. In the combined editing and playback process, a user must relinquish control of one of the pointing devices to initiate and control the playback.

In other systems, graphical icons are used to represent the analogous VCR commands. These graphical icons not only require a break in the user's visual and mental concentration on the video playback but also consume valuable screen real estate. Still further some systems map the temporal controls to a set of function keys. This technique proves unsatisfactory because (1) the function mapping is not intuitively obvious to the user and (2) the binary nature (on/off) of the keys restricts playback options.

Finally, some systems implement Marking Menus. Marking Menus, which appear as a circular or "pie" menu centered around the current cursor position, are not visible until the mouse/pen dwells for a period of time. Whether visible or not, making an angular mark selects a pie wedge which then executes a command. This system is disadvantageous because it requires action by the dominant hand to activate a temporal control. The Marking Menu solution does not allow one to simultaneously edit graphical objects and issue transport commands.

Therefore, what is needed is an integrated mapping of temporal control features within the existing framework of time-based media editing systems that allows a user to efficiently edit graphical objects within the iterative process of video playback.

SUMMARY OF THE INVENTION

The invention satisfies the above mentioned needs by providing a system and method that maps temporal control (or transport) features into a six degree of freedom pointing device that is also used for the translational-rotational control (or view) of graphical objects. Toggling between these two modes is accomplished through the user's control of the buttons on the six degree of freedom pointing device. Accordingly, both transport and view control is accomplished through the user's manipulation of a "cap" that moves in any of the six degrees of freedom (i.e., linearly in the X, Y and Z directions and rotationally in the A, B and C directions).

Specifically, with regard to linear movement (positive and negative directions) in the X, Y and Z direction and rotational movement (positive and negative directions) in the A, B and C directions, the following mappings are implemented: (1) movement in the positive and negative "X" direction moves the display to the last frame and first frame, respectively; (2) movement in the negative "Y" direction stops the video playback; (3) movement in the positive and negative "Z" direction marks and unmarks keyframes, respectively; (4) rotation in the positive and negative "A" direction decrements and increments the keyframes, respectively; (5) rotation in the positive and negative "B" direction decrements and increments a frame (or frames), respectively; and (6) rotation in the positive and negative "C" direction plays the video backward and forward, respectively.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

The preferred embodiment of the invention is discussed in detail below. While specific configurations are discussed, it should be understood that this is done for illustration purposes only. After reading the following description, it will become apparent to a person skilled in the relevant art that other components and configurations may be used without parting from the spirit and scope of the invention.

Figure 1:
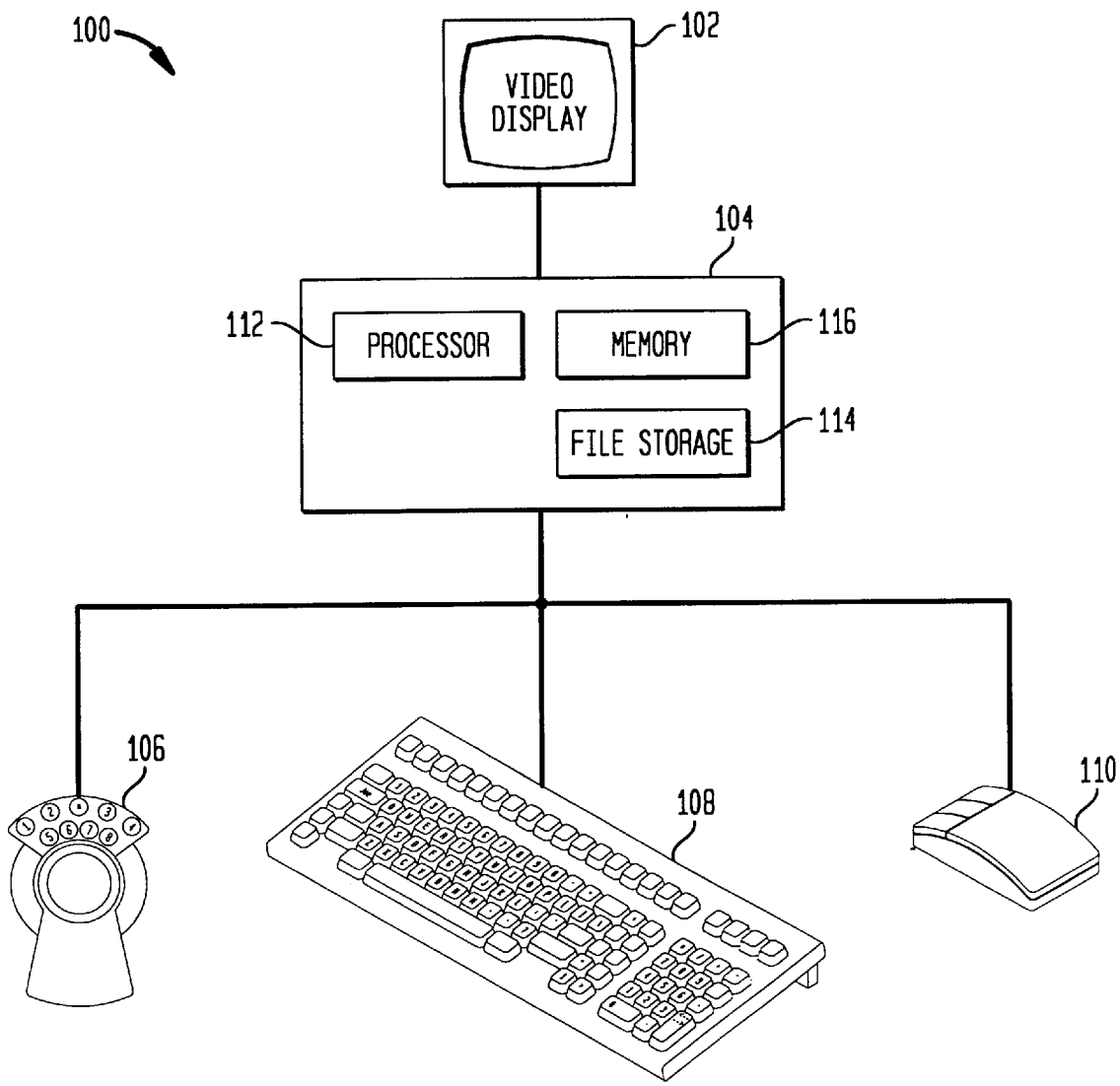
FIG. 1 shows a conventional time-based media editing system.

FIG. 1 illustrates a high-level overview of the hardware existing in a conventional time-based media editing system 100. Time-based media editing system 100 includes a processing system 104 that comprises a processor 112, memory 116 and file storage 114. Processing system 104 receives inputs from a six degree of freedom (6DF) pointing device 106, a keyboard 108 and a pointing device 110 (e.g., mouse or stylus). These inputs are used to control and edit graphical objects that appear on video display 102. Typically, 6DF pointing device 106 controls the translational and rotational aspects of a graphical object in a single frame through movements in a user's non-dominant hand (shown in FIG. 1 to be the left hand). Pointing device 110, operated by the user's dominant hand, controls the editing of a graphical object.

Figure 2:
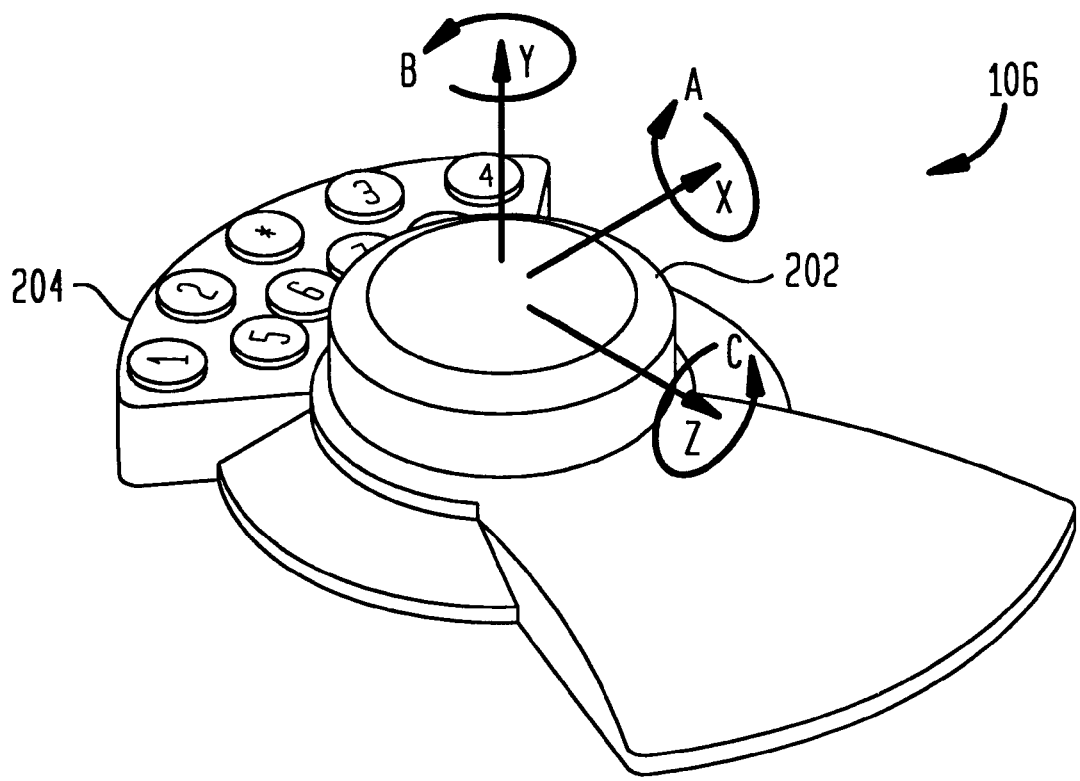
FIG. 2 shows a six degree of freedom pointing device.

FIG. 2 illustrates 6DF pointing device 106 in more detail. As illustrated, 6DF pointing device comprises a cap 202 and a button panel 204. Cap 202 is operative by a user in any of the six degrees or ranges of motion depicted by straight arrows X, Y and Z and circular arrows A, B and C. Although arbitrarily selected, this description assumes that the linear or circular arrow points in the positive direction.

As previously stated, signals from 6DF pointing device 106 are generally used to rotate, translate and scale objects in 3D space. Concerning translation and rotation, the manipulation of a graphical object within a frame largely corresponds to the manipulation of cap 204 by the user. The correspondence of movement of cap 204 to movement of a graphical object is mandated by the human-factors principle of stimulus-response compatibility. The principle of system-response compatibility states that system responses to user actions must be in the same direction or same orientation, and that the magnitude of the responses should be proportional to the actions. Applied to generalized pointing devices, this framework requires that the movement of a pointing device within the user's physical domain must correspond to the movement of a graphical object or pointer within the virtual physical space displayed on the screen.

The present invention represents a shift from the traditional framework of direct physical correspondence. Specifically, the movement of cap 204 on 6DF pointing device 106 now additionally corresponds to temporal control functions. By this new correspondence, the present invention builds upon the user's existing skill set of 6DF pointing device manipulation. The intuitive feel, gained through familiarity, enables the user to enact the temporal controls comfortably as part of the overall editing process. These factors play a large role in the seamless operation of the overall editing process. Additionally, audio feedback can also be implemented to provide additional feedback cues that mimic the sound of traditional analog VCR control decks.

As stated previously, this overall editing process is a visually demanding task. Critical to the efficiency of this process is the ability to maintain visual contact with the subject graphical object(s). In known systems, pointing devices 106 and 110 allowed a user to edit graphical objects in a single frame while maintaining visual contact. However, editing within a single frame is merely a part of an iterative process that spans multiple editing sessions on multiple frames within a sequence. Presently, this iterative process suffers from the inability to efficiently coordinate the frame editing process with the temporal functions that provide the critical feedback.

By mapping the temporal controls into 6DF pointing device 106, the user may repeatedly invoke both transport and view control without losing visual contact with a graphical object on the screen. Specifically, button panel 204 on 6DF pointing device 106 allows a user to instantly switch between transport and view modes. Transport mode represents the use of 6DF pointing device 106 for temporal control. View mode represents the use of 6DF pointing device 106 for translational-rotational control (i.e., conventional use).

Clearly, the toggling between transport and view modes by the non-dominant hand does not require a break in the user's visual contact with the screen. Thus, a user can edit a frame, view the playback of the sequence of frames, return and edit that frame again, view the playback of the sequence again, etc. without breaking visual contact. In systems that utilize a separate physical device, graphical VCR icons, function keys, or marking menus, a break in editing and/or visual contact is typically incurred when switching from editing and playback or vice-versa.

Table 1 illustrates the mapping implemented in a preferred embodiment. Clearly, this mapping is adjustable based on user preferences. The directions and dimensions of Table 1 correspond to the notated arrows on FIG. 2.

In this mapping, a user can immediately go to the first or last frame of the sequence by moving cap 202 linearly in either the positive or negative X direction (right and left respectively).

To stop the current video playback the user pushes cap 202 downward or in the negative Y direction. Momentary commands such as stop, play, and frame advance are implemented with a debouncing mechanism. Thus, once a control dimension surpasses a threshold value, a command is executed and another command is not executed until the cap returns back to its rest (or null) position.

TABLE 1

| Dimension | Positive Direction | Negative Direction |
|---|---|---|
| X | Go to Last Frame | Go to First Frame |
| Y |  | Stop Playback |
| Z | Mark Keyframe | Unmark Keyframe |
| A | Keyframe Decrement | Keyframe Increment |
| B | Frame Decrement | Frame Increment |
| C | Play Backward | Play Forward |

As table 1 illustrates, there remain yet unused dimensions of the device which are not utilized (e.g., Y positive axis, and Z dimensions). These are reserved for application specific commands. For example, within the animation domain, translation in the Z direction of cap 202 will mark or unmark a time frame. Alternatively, the Z dimension can be used to create or delete a key frame. In addition, a "double-tap" on cap 202 (negative Y direction) can be used to issue a command (separate from the single tap for stopping playback).

Within the animation domain, tilting cap 202 on the top and bottom (dimension A) will advance or retard the current time unit to the next designated "keyframe" for the active (currently selected) animation objects.

Similarly, a quick twisting of cap 202 to the right or left (dimension B) will advance or decrement by a single time unit (or frame). Extended or prolonged twists of cap 202 will result in multiple frame advances or decrements. Sequential frames will be accessed (e.g, 1, 2, 3, 4 . . . ) until a threshold time is reached when the frame access jumps from single frame increments to larger units (e.g., 1, 2, 4, 8, 16, . . . ). This allows for accelerated movement in the time domain.

There are a number of methods for making the transition from single to multiple frame advances/retards. In a first method labelled as pure gain, the "gain" or the "force" required to twist the cap indicates the number of frames to increment or decrement. For example, small twists (low force) will transition by single frames. More moderate twists/force will transition by multiple time units (2, 3, 4, . . . ) until the maximum twist/force is reached. This approach is problematic for 6DF pointing devices in which the cap only twists by a +/−4 degree rotation. Accordingly, difficulties arise in discriminating between twists.

In a second method labelled as pure temporal, the twist/force values are ignored. The system only detects whether the cap is resting or has been twisted by any amount (larger than noise). Once motion is detected, a timer is started and a single frame is incremented/decremented. If the user persists in holding the cap in the twisted state and the timer exceeds a threshold value, the system switches into multiple frame mode. Within this multiple frame mode, a series of timers is used to advance to each successive step value (e.g., 2, 3, 4 . . . ). In this system, the series of timers can be designed with uniform or non-uniform time intervals.

In a further method, the system utilizes a combination of the pure gain and pure temporal methods. In this system, the cap is divided into three uneven regions that translate to the 0–4 degrees of rotation in the positive or negative B direction.

| | |
|---|---|
| Region 1 (0–25%) | Advance/retard 1 frame at a time (or slow the frame advance until we are advancing 1 frame at a time. This occurs when going from Region 2 back to Region 1) |
| Region 2 (25–97%) | Advance/retard multiple frames at a time (and increase or decrease the current frame advance) until it reaches some defined medium unit (M). |
| Region 3 (97–100%) | Advance/retard multiple frames at a time, (and increment the frame advance until it reaches some secondary maximum unit (F). |

As the above description indicates, maintaining cap 202 in any one of regions 1, 2 or 3 will result in an eventual frame advance/retard equilibrium being reached. For region 1, the equilibrium is 1 frame at a time. For region 2, the equilibrium is M frames at a time. Finally, for region 3, the equilibrium is F frames at a time. As would be obvious to one of ordinary skill in the relevant art, the rate at which the system approaches a given equilibrium point may vary. For example, the rate at which the system approaches the equilibrium of M frames at a time in region 2 may depend upon whether cap 202 previously resided in region 1, region 3 or no region at all. Moreover, the rate of approach towards a particular equilibrium may also depend upon the particular region itself. Ultimately, the particular design choice must be consistent with the goal of providing the user with a seamless environment in which to work.

As an exception to the regions defined above, there will always be a ¼ second delay before any one of Regions 1, 2 or 3 are entered. Regardless of the magnitude of the movement of cap 202 in the B direction, if cap 202 is released within a ¼ second, only 1 frame will be advance or retarded. This delay allows the user to move one frame at a time with a single thrust of cap 202 without worrying about the relative precision identified by the different regions. Again, this feature allows the user to efficiently use cap 202 to implement the temporal commands.

Finally, the mapping of Table 1 translates the tilting of cap 202 to the right or left (dimension C) to playback at normal speed (in the forward or backward direction respectively).

In a further embodiment, the playback speed is additionally controlled by the force applied to cap 202. To guarantee a reliable playback at greater than normal speeds, only a sampling of frames is played back. This results because of the time required to generate/compute the next frame.

Generally, the playback feature permitted by the temporal control mapping allows for expanded video playback functionality as compared to conventional systems. Specifically, rocking the cap back and forth in the left and right directions, enables one to "rock and roll" back and forth smoothly over a particular segment of frame data without having to explicitly issue a stop playback command when changing directions.

Through this rocking, a sequence of frames is played forwards and backwards repeatedly. In effect, this continuous replay allows a user to identify the effect of an editing session on a sequence of frames. If further editing of a graphical object within a frame is required, the user can use pointing device 110. If the editing process required the translation or rotation of a graphical object, then the user can quickly toggle to the view mode and edit the keyframe that proved unsatisfactory based on the previous visual feedback. Again, the benefit of the temporal control mapping of Table 1 is evident in the seamless manner in which a user can edit and review a sequence of frames without breaking visual contact with the graphical objects of interest.

Figure 3:
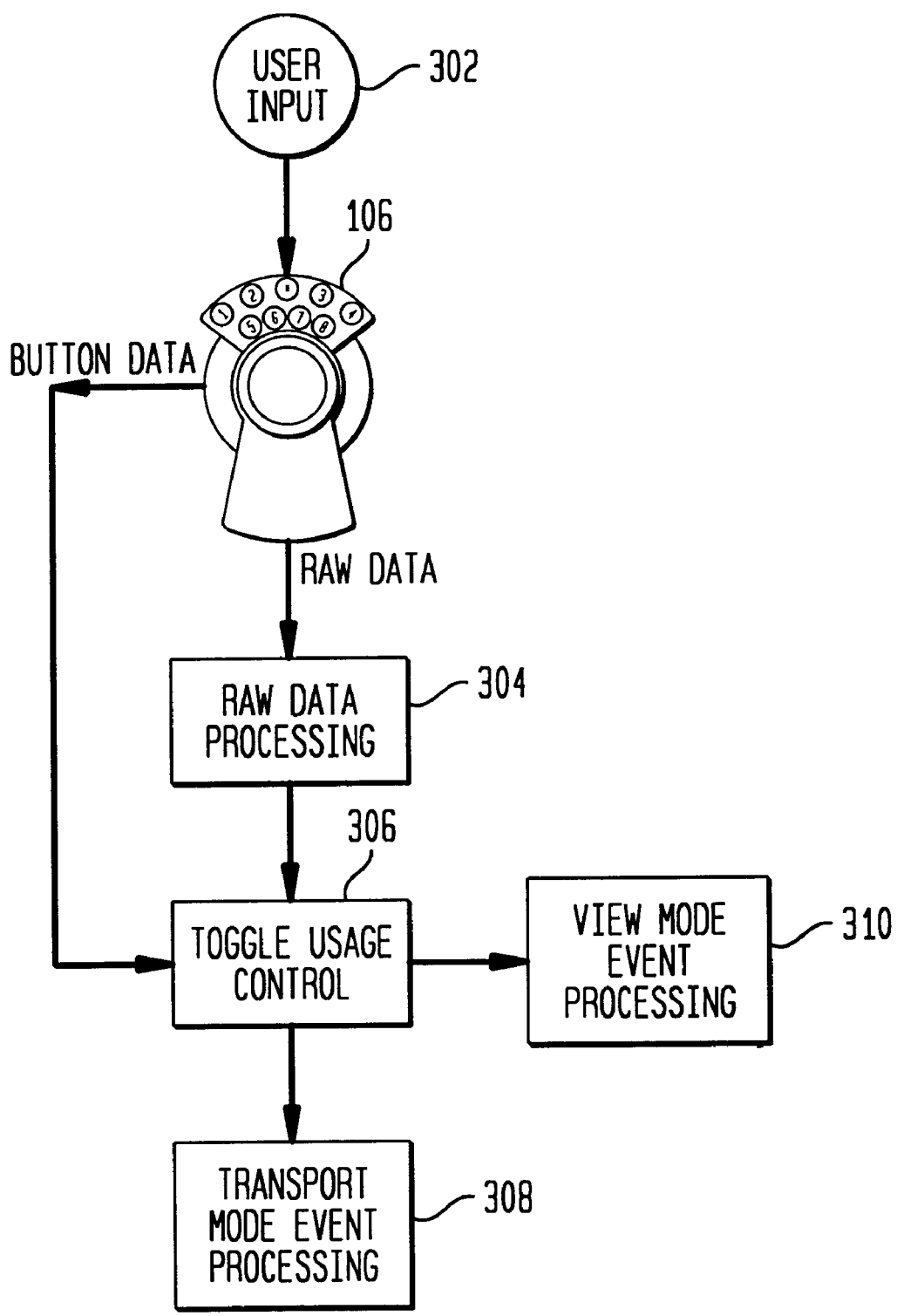
FIG. 3 shows a data flow diagram among the functional components.

The functional components used to implement this seamless process is illustrated in FIG. 3. In FIG. 3, a user provides user input 302 to a 6DF pointing device 106. Based on user input 302, 6DF pointing device 106 generates both raw data and button data. The processing of raw data processing 304 is described in greater detail below. The button data is used to toggle between transport and view modes in toggle usage control 306. Depending upon the specific mode selected, an event is processed by either transport mode event processing 308 or view mode event processing 310. View mode event processing 310 is implemented in a conventional fashion and will not be described in greater detail. In addition to the description that follows, the processing steps in each of elements 304, 306 and 308 are further described in the pseudo code that appears in the Appendix.

Figure 4:
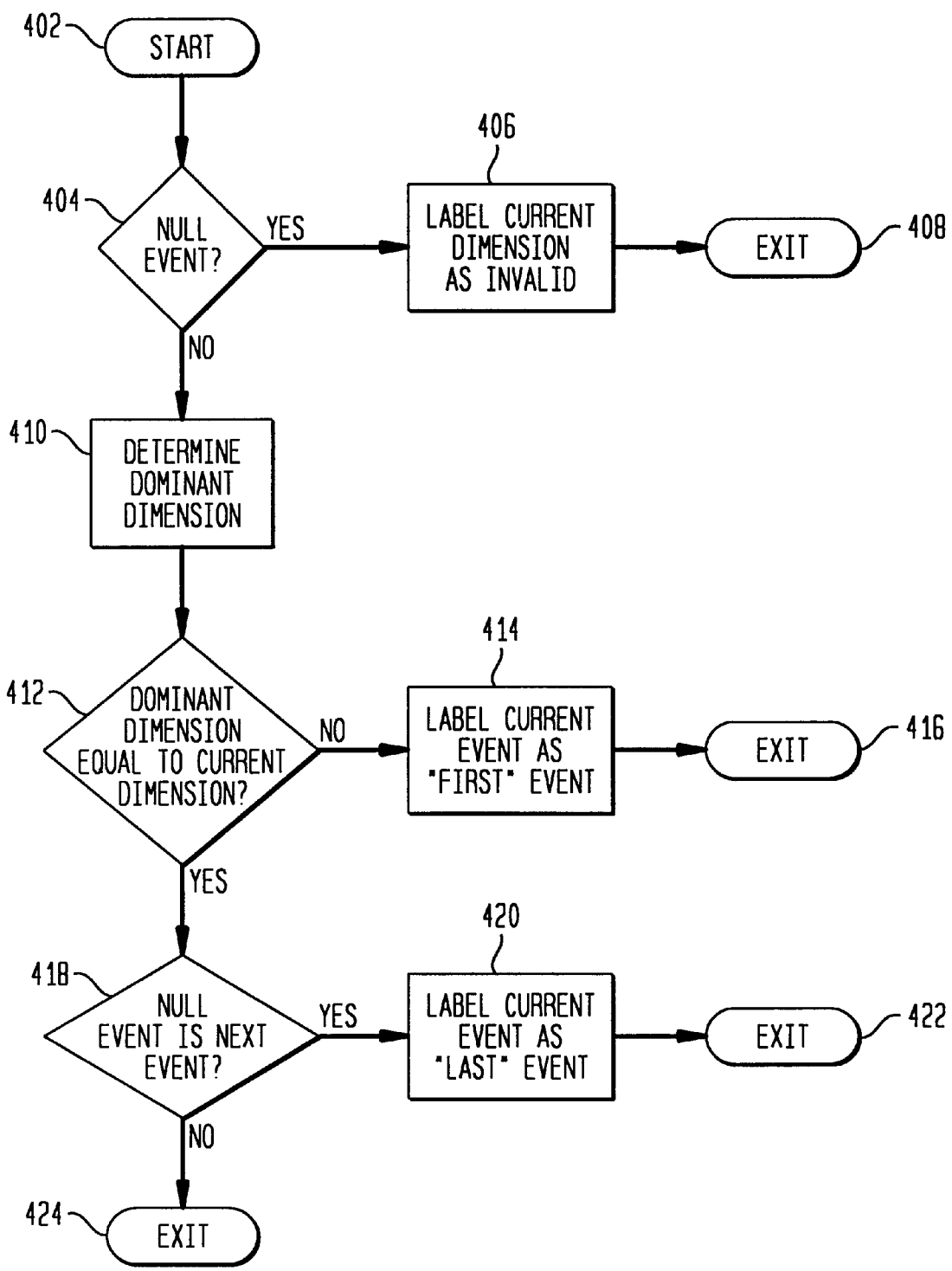
FIG. 4 shows a flow chart of the processing of input received by the six degree of freedom pointing device.

FIG. 4 illustrates a flow diagram illustrating the processing steps of raw data processing 304. This flow chart corresponds to the ReceiveSpaceMouseEvent procedure of the pseudo code.

In a preferred embodiment, the system is implemented as an event-based system. However, a person of ordinary skill in the relevant art will recognize that temporal control mappings are independent of the actual method of receiving inputs from a pointing device. Accordingly, in other embodiments, the system polls the pointing device. The rest of the discussion, however, assumes that an event-based input system exists.

In this event-based input system, the data received by raw data processing 304 is a series of 6-tuples corresponding to the six degrees of freedom (X,Y,Z,A,B,C). Each of the 6-tuples is stored as an event in an event-queue that exists as a buffer between the pointing device and the application program. An event consisting of all zeros (0,0,0,0,0,0) is a special event which is termed a null event. In step 404 of FIG. 4, the system determines whether the received event is a null event. If the event is a null event then the current dimension is set to invalid in step 406 and the processing completes. If the event is not a null event, then the dominant dimension is determined in step 410.

Generally, for a given event, many 6DF input devices will sample the data for all 6 dimensions and report this data back to the application. An application often uses all dimensional data simultaneously to update the objects being manipulated by the user. In transport mode, the application program is interested in only one dimension since temporal controls in different dimensions of Table 1 are not implemented simultaneously. Moreover, unintended dimensional data resulting from sloppy manipulation of cap 202 by the user should be discarded. Accordingly, after receiving an event, the system selects the largest dimension and makes that the dominant dimension. If it is different than the current dimension then it places a Null event in the event queue. This technique greatly reduces "noise" and the resulting improperly executed commands.

Once the dominant dimension has been identified, steps 412, 414, 418 and 420 are used to classify the current event. In particular, if step 412 determines that the dominant dimension is not equal to the current dimension (i.e., dimension of previous non-null event) then step 412 classifies the current event as a first event.

Conversely, if step 412 determines that the dominant dimension is equal to the current dimension, then step 414 is invoked. Step 414 identifies whether the event following the current event in the event queue is a null event. If the next event is equal to the null event, then the current event is labelled as a last event in step 420. This labelling identifies whether the current event is last in a string of events in a single dimension.

After the raw data has been processed in accordance with FIG. 4, the usage mode is selected based on the button data from 6DF pointing device 106. The processing based on the selection of the transport mode is now described.

Figure 5:
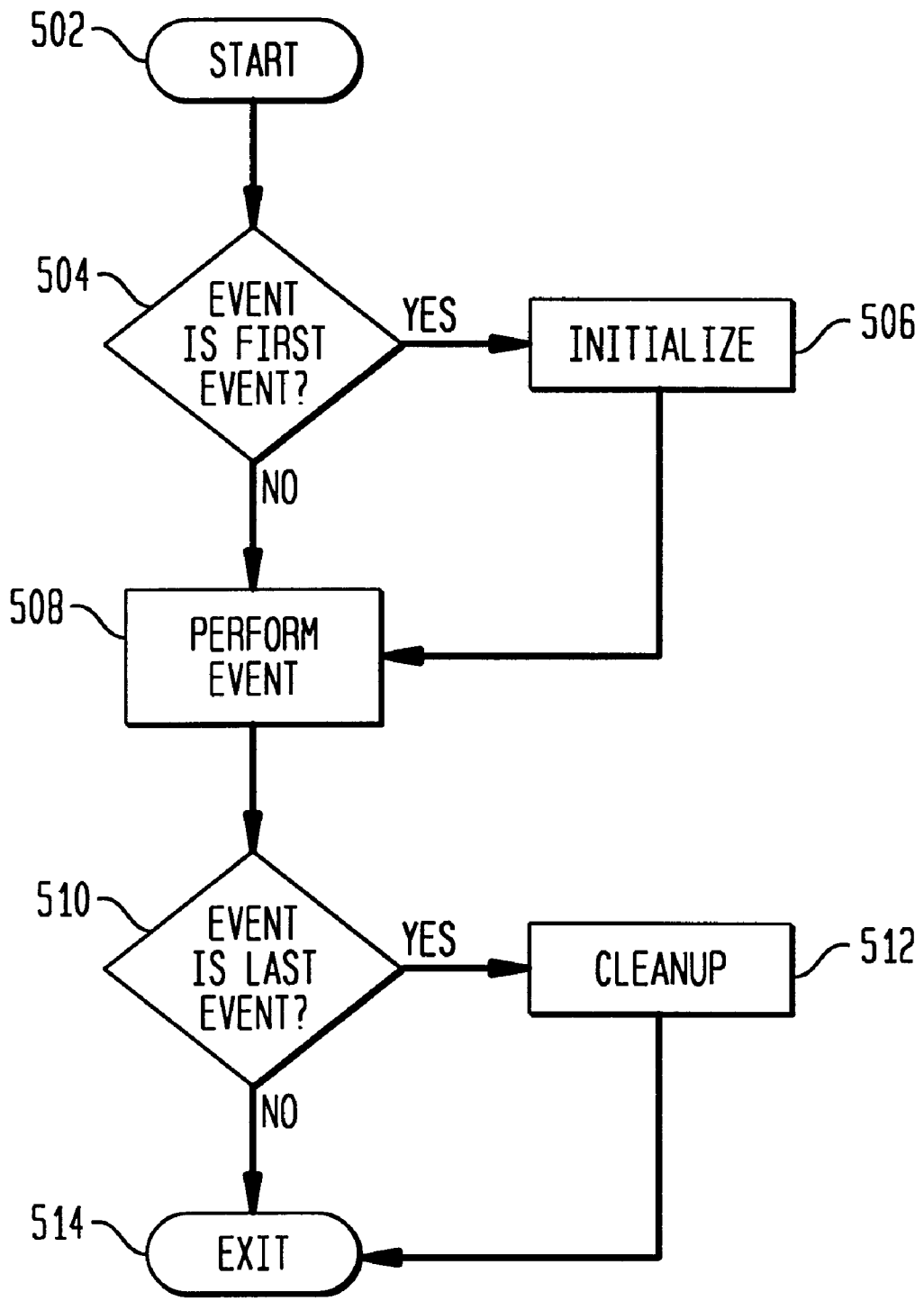
FIG. 5 shows a flow chart illustrating the handling of an event.

Transport mode event processing 308 is illustrated in the flow chart of FIG. 5. This flow chart corresponds to the AnimationProcessSpaceMouseEvent procedure in the pseudo code. As illustrated, step 504 first identifies whether the current event is flagged as a first event. If the current event is flagged as a first event, step 506 initializes the 6DF pointing device prior to the performance of the current event in step 508. Step 506 corresponds to the InitializeSpaceMouse procedure in the pseudo code. If the current event is not flagged as a first event, then the performance of the event in step 508 immediately follows.

After the event is performed in step 508, a second determination is made regarding the status of the current event. Specifically, step 510 determines whether the current event is flagged as a last event. If the current event is flagged as a last event, step 512 performs a cleanup of the 6DF pointing device 106 prior to exiting. Step 512 corresponds to the CleanupSpaceMouse procedure of the pseudo code.

Figure 6:
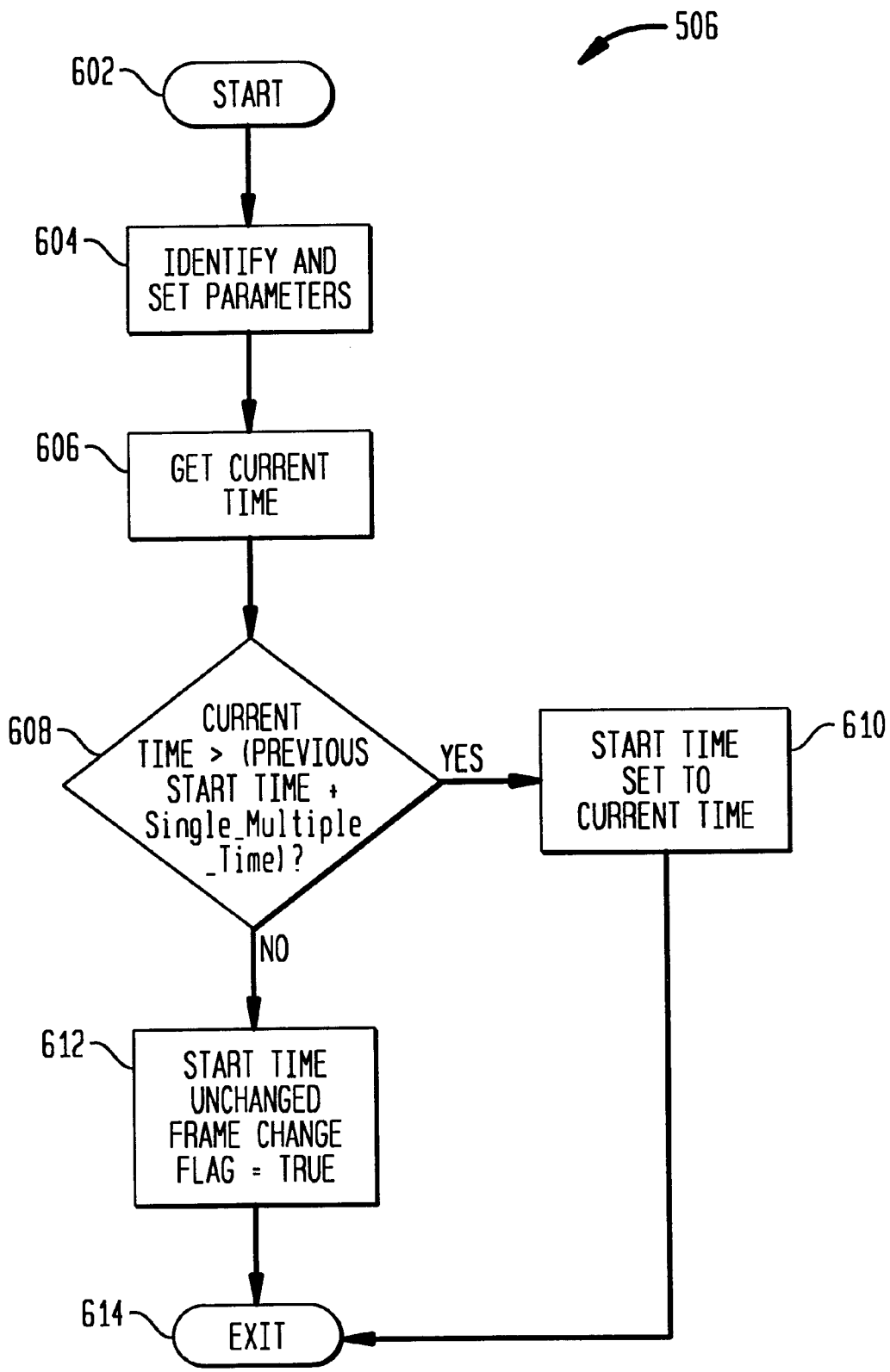
FIG. 6 shows a flow chart of the initialization of the six degree of freedom pointing device.

FIG. 6 illustrates a more detailed description of the processing within initialization step 506. In this procedure, step 604 first sets the parameters that will be used in subsequent processing (e.g., identifying start and end frames). Next, in step 606, the time of the current event is identified.

In step 608, this current time is compared to the previous start time plus the constant Single_Multiple_Time. The meaning of this comparison may be viewed in light of a sequence of events received from 6DF pointing device 106.

Figure 7:
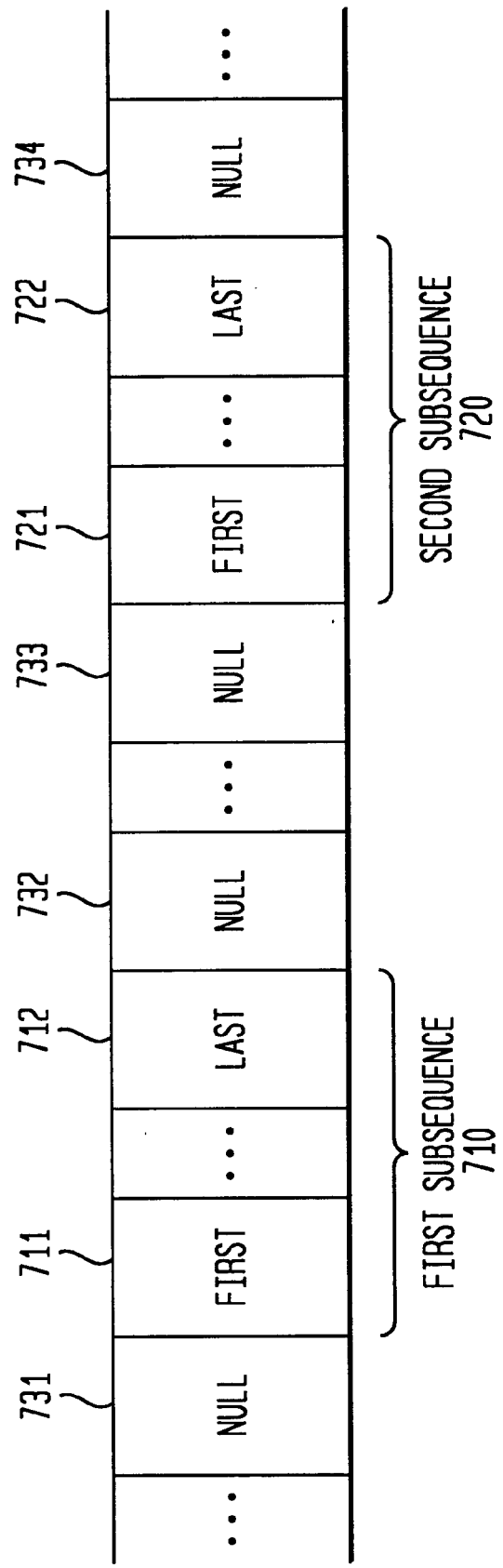
FIG. 7 shows a sequence of events received by a six degree of freedom pointing device.

An exemplary sequence of events is illustrated in FIG. 7. This sequence of events includes subsequences 710, 720 of events that are separated by at least one null event. Specifically, subsequence 710 includes the span of events from first event 711 to last event 712 inclusive. Subsequence 710 is separated from subsequence 720 by the span of events from null event 732 to null event 733 inclusive. With further reference to FIG. 7, the time associated with a first event 711, 721 in a subsequence 710, 720 is equal to the start time.

If we assume that initialization step 506 is invoked upon the receipt of first event 721 then the current time identified in step 606 is equal to the time of first event 721. This current time is compared to the previous start time (i.e., time of first event 711) plus the constant Single_Multiple_Time. In a preferred embodiment, the constant Single_Multiple_Time is set to 0.5 seconds.

By this comparison, step 608 determines whether event subsequence 720 is a continuation of event subsequence 710. This determination is important for the frame increment/decrement feature wherein the rate of advancement is variable. If the current time is greater than the previous start time plus the Single_Multiple_time, then independence between event subsequences 710 and 720 is inferred and the start time is set to the current time in step 610. However, if the current time is less than the previous start time plus the Single_Multiple_time then, in step 612, the start time remains as the previous start time and the FrameChanged flag is set to true. This FrameChanged flag is used within the Frame_Increment selection within the DoSpaceMouse procedure of the pseudo code.

After initialization step 506 is completed or the event is not flagged as a first event, step 508 is invoked for actual performance of the event. Step 508 corresponds to the DoSpaceMouse procedure of the pseudo-code. The DoSpaceMouse procedure includes the set of actions to be taken upon receipt of a particular event (e.g., FRAME_INCREMENT, STOP_PLAYBACK, etc.).

After the event is performed in step 508, step 510 determines if the current event is flagged as a last event. If so, step 512 performs a cleanup in accordance with the CleanupSpaceMouse procedure of the pseudo code.

While the invention has been particularly shown and described with reference to preferred embodiments thereof, it will be understood by those skilled in the relevant art that various changes in form and details may be made therein without departing from the spirit and scope of the invention.

---

Appendix (Pseudo Code)

ReceiveSpaceMouseEvent(evt)
    if event is Null then set current_dimension to INVALID and
        return immediately
    determine dominant dimension
    if dominant dimension is not same as current_dimension
        then flag current event as FIRST event
    Examine event queue to see if Null event is next.
    If Null event is next then flag current event as LAST event
    ProcessSpaceMouseEvent(dominantDimension)
ProcessSpaceMouseEvent(evt)
    if controlling Animation then
    AnimationProcessSpaceMouseEvent(evt)
    else if controlling view then ViewProcessSpaceMouseEvent(evt)
AnimationProcessSpaceMouseEvent(evt)
    if evt is flagged as FIRST then call InitializeSpaceMouse( )
    DoSpaceMouse(evt)
    if evt is flagged as LAST then call CleanupSpaceMouse( )

Appendix (Pseudo Code) -continued

```
InitializeSpaceMouse( )
    set AnimData to current animation data
    Determine start and end frame range for animation
    reset playScale to 1
    reset FrameChanged flag to FALSE
    reset keyFrameChanged flag to FALSE
    get current time
    if current time is greater than PreviousStartTime plus
        SINGLE_MULTIPLE_TIME threshold interval then
        set StartTime to current time
        else set FrameChanged flag to TRUE and do not set
            StartTime (i.e., continue using previous value)
        [guarantees minimum pause between single frame adjustments]
DoSpaceMouse(evt)
    check for valid dimension in event (evt)
    Given dominant dimension select one of following actions:
    FRAME_INCREMENT:
        if FrameChanged is TRUE then
            if currentTime is greater than StartTime plus
                SINGLE_MULTIPLE_TIME then
                go into multiple increment mode:
                    Stop any animation playback
                    retrieve current PlayFrame
                    if evt.dataValue is negative then
                        PlayDirection = FORWARD
                        else PlayDirection = BACKWARD
                    computePlayScale(evt.dataValue)
                    getNextFrame( )
                    AN_playFrame(PlayFrame, CurFrame)
            else
                do Nothing
        else [Single frame mode]
            if evt.dataValue is positive
                PlayDirection = BACKWARD
                AN_dec_frame(AnimData)
            else
                PlayDirection = FORWARD
                AN_inc_frame(AnimData)
            FrameChanged = TRUE
    STOP_PLAYBACK:
        AN_playback_stop( )
    ENDPOINTS:
        if (absoluteValue(evt.dataValue) is less than
            MOVEMENT_THRESHOLD then return
        else
            if evt.dataValue is positive
                set CurFrame = EndFrame
                AN_end_frame( )
            else
                set CurFrame = StartFrame
                AN_start_frame( )
    KEYFRAME:
        if KeyFrameChanged is set to FALSE then
            if absoluteValue(evt.dataValue) is less than
                MOVEMENT_THRESHOLD return
            else
                if evt.dataValue is negative
                    PlayDirection = BACKWARD
                    AN_dec_keyframe( )
                else
                    PlayDirection = FORWARD
                    AN_inc_keyframe( )
                KeyFrameChanged = TRUE
    PLAYBACK:
        if evt.dataValue is negative
            PlayDirection = BACKWARD
            AN_playback_current_rev( )
        else
            PlayDirection = FORWARD
            AN_playback_current_fwd( )
ComputePlayScale(val)
    if abs(spaceMouseVal) > MOVEMENT_THRESHOLD
        numFrames = Last Frame - Start Frame
        val = abs(spaceMouseVal)-MOVEMENT_THRESHOLD;
        accelFactor = Space_Mouse_Units * SM_accel_Factor;
        PlayScale = (int) MAX(1.0, (MIN(0.1, (val / accelFactor)) *
            numFrames));
```

Appendix (Pseudo Code) -continued

```
MIN(A, B)
    if A is less than B then return A else return B
MAX(A, B)
    if A is greater than B then return A else return B
GetNextFrame( )
    if PlayDirection is FORWARD
        increment the current animation frame by 1 * PlayScale
    else
        decrement the current animation frame by 1 * PlayScale
    [Range check. If at an endpoint, loop around]
    if CurFrame is greater than EndFrame set CurFrame to StartFrame
    if CurFrame is less than StartFrame set CurFrame to EndFrame
CleanupSpaceMouse( )
    redraw any pending graphics
    if a PlayFrame exists then
        AN_playback_stop( )
        Delete PlayFrame
The following routines are commands/functions provided by the animation
application:
AN_playback_stop( ) - stop current animation from playing back
AN_playFrame(Frame) - display animation frame "Frame"
AN_playback_current_rev( ) - start reverse playback from current frame
AN_playback_current_fwd( ) - start forward playback from current
frame
AN_dec_frame( ) - decrement animation by 1 frame from current frame
AN_inc_frame( ) - increment animation by 1 frame from current frame
AN_end_frame( ) - go to last frame in animation
AN_start_frame( ) - go to first frame in animation
AN_dec_keyframe( ) - decrement animation until hit previous
keyframe set from current frame
AN_inc_keyframe( ) - increment animation until hit next keyframe
set from current frame
```

Notes:
SM_accel_factor is a user settable value between (0.001 and 1.0).
MOVEMENT_THRESHOLD is the minimum value needed to execute
the command (i.e,. lower values are considered noise).
Space_Mouse_Units is a device specific constant.
PlayFrame is a data structure associated with the animation that indicates
how the animation will be viewed.

What is claimed is:

1. In a system for controlling playback of temporal digital media, a system for controlling the transition from single to multiple frame increment/decrement modes, comprising:

means for dividing a maximum range of motion in one direction along a single degree of freedom by a pointing device into a plurality of regions, wherein each of said plurality of regions corresponds to a unique rate of frame increments/decrements, each of said unique rate of frame increments/decrements representing an equilibrium point within that corresponding region;

means for classifying an event based on movement of said pointing device along said single degree of freedom into one of said plurality of regions; and means for controlling transitions between said equilibrium points based on the length of time that said pointing device resides in a particular region.

2. In a method for controlling playback of temporal digital media, a method for controlling the transition from single to multiple frame increment/decrement modes, comprising the steps of:

dividing a maximum range of motion in one direction along a single degree of freedom by appointing device into a plurality of regions, wherein each of said plurality of regions corresponds to a unique rate of frame increments/decrements, each of said unique rate of frame increments/decrements representing an equilibrium point within that corresponding region;

classifying an event based on movement of said pointing device along said single degree of freedom into one of said plurality of regions; and controlling transitions between said equilibrium points based on the length of time that said pointing device resides in a particular region.

* * * * *